US006975759B2

(12) United States Patent
Lin

(10) Patent No.: US 6,975,759 B2
(45) Date of Patent: Dec. 13, 2005

(54) METHOD AND SYSTEM FOR WHITE BALANCING IMAGES USING FACIAL COLOR AS A REFERENCE SIGNAL

(75) Inventor: Yun-Ting Lin, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 526 days.

(21) Appl. No.: 10/179,360

(22) Filed: Jun. 25, 2002

(65) Prior Publication Data

US 2003/0235333 A1  Dec. 25, 2003

(51) Int. Cl.[7] .............................................. G06K 9/00
(52) U.S. Cl. ..................... 382/167; 382/115; 382/190; 382/274; 382/305; 358/516; 358/515
(58) Field of Search ................................ 382/162, 164, 382/165, 166, 167, 115, 118, 190, 198, 254, 382/274, 305; 358/516, 515, 518; 348/223.1, 348/655, 690

(56) References Cited

U.S. PATENT DOCUMENTS

| | | | |
|---|---|---|---|
| 5,296,945 A * | 3/1994 | Nishikawa et al. ......... | 358/518 |
| 5,420,630 A * | 5/1995 | Takei ....................... | 348/223.1 |
| 5,428,402 A | 6/1995 | van Rooij .................. | 348/649 |
| 5,430,809 A * | 7/1995 | Tomitaka ................... | 382/173 |
| 5,831,672 A * | 11/1998 | Takei ....................... | 348/225.1 |
| 6,069,972 A | 5/2000 | Durg et al. ................ | 382/167 |
| 2003/0001958 A1 * | 1/2003 | Hoshuyama ............. | 348/223.1 |
| 2003/0234866 A1 * | 12/2003 | Cutler ..................... | 348/207.1 |

FOREIGN PATENT DOCUMENTS

| JP | 136546 | 5/2001 |
|---|---|---|
| JP | 148863 | 5/2001 |

* cited by examiner

Primary Examiner—Kanjibhai Patel
Assistant Examiner—Ali Bayat

(57) ABSTRACT

A system for white balancing images using facial color as a reference signal is provided. The system includes a face detector that is operable to receive a digital image and to detect a human face within the digital image. A skin tone extractor is operable to extract a skin tone from the digital image. The extracted skin tone is associated with a human face detected by the face detector. A skin tone comparator is operable to access reference skin tones and to compare the extracted skin tone to the reference skin tones in order to identify a reference skin tone corresponding to the extracted skin tone. A balance parameter generator is operable to generate a balance parameter based on the extracted skin tone and the corresponding reference skin tone. The balance parameter is operable to be applied to the digital image to white balance the digital image.

18 Claims, 3 Drawing Sheets

METHOD AND SYSTEM FOR WHITE BALANCING IMAGES USING FACIAL COLOR AS A REFERENCE SIGNAL

TECHNICAL FIELD OF THE INVENTION

The present invention relates generally to video processing systems and, more particularly, to a method and system for white balancing images using facial color as a reference signal.

BACKGROUND OF THE INVENTION

The colors in images from a digital camera or camcorder or displayed on a television screen or the monitor display of a personal computer frequently exhibit differences from image to image due to a variety of reasons. In order to maintain constant color appearance from image to image, a technique referred to as white balancing is often employed. Using this technique, the white in an imaged scene is used as a reference, allowing the entire scene to be color-adjusted based on that white.

Conventional white balancing of digital images is provided through both manual and automatic means. For manual white balancing, the imaging device is typically aimed at a reference surface that is presumed to be white under white illumination. For automatic white balancing, an assumption is generally made that a white object exists within the imaged scene and presumably the white object corresponds to the brightest spot in the image. The white balancing is then performed using that assumed white object as a reference. However, when a white object is not actually within the imaged scene or the brightest spot does not belong to a referenced white surface, this technique may lead to incorrectly adjusted images.

SUMMARY OF THE INVENTION

In accordance with the present invention, a method and system for white balancing images using facial color as a reference signal are provided that substantially eliminate or reduce disadvantages and problems associated with conventional systems and methods. In particular, automatic white balancing may be provided using a human face as the color reference instead of a white object, allowing scenes in which white objects do not appear to be properly color-adjusted.

According to one embodiment of the present invention, a system for white balancing images using facial color as a reference signal is provided that includes a face detector, a skin tone extractor, a plurality of reference skin tones, a skin tone comparator, and a balance parameter generator. The face detector is operable to receive a digital image and to detect a human face within the digital image. The skin tone extractor is operable to extract a facial color model that is invariant across various ethnic groups. The skin tone extractor is coupled to the face detector. The skin tone extractor is operable to extract a skin tone from the digital image. The extracted skin tone is associated with a human face detected by the face detector. The skin tone comparator is coupled to the skin tone extractor. The skin tone comparator is operable to access the reference skin tones and to compare the extracted skin tone to the reference skin tones in order to identify a reference skin tone corresponding to the extracted skin tone. The balance parameter generator is coupled to the skin tone comparator. The balance parameter generator is operable to generate a balance parameter based on the extracted skin tone and the corresponding reference skin tone. The balance parameter is operable to be applied to the digital image to white balance the digital image.

According to another embodiment of the present invention, a method for white balancing images using facial color as a reference signal is provided. The method includes receiving a white balancing input signal from a digital image. A determination is made regarding whether a human face is detected in the input signal. A skin tone for the detected face is extracted when the face is detected in the input signal. The extracted skin tone is compared to a plurality of reference skin tones to identify a corresponding reference skin tone. A balance parameter is generated based on the extracted skin tone and the corresponding reference skin tone.

Technical advantages of one or more embodiments of the present invention include providing an improved method for automatically white balancing images. In a particular embodiment, a human face is used as the color reference in an imaged scene, as opposed to a white object. As a result, scenes in which white objects do not appear may be properly color-adjusted based on the human face.

Other technical advantages will be readily apparent to one skilled in the art from the following figures, description, and claims.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
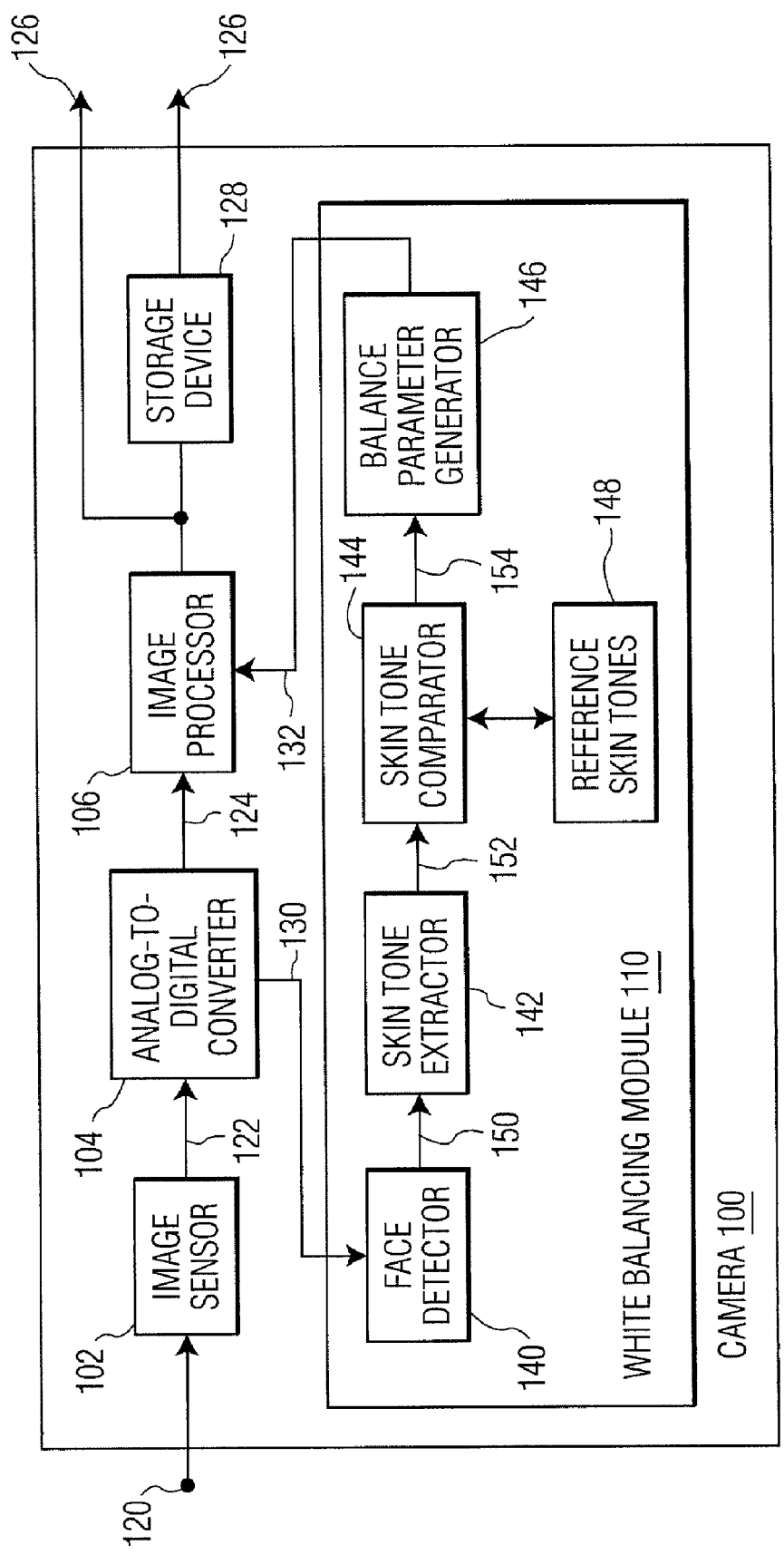
FIG. 1 is a block diagram illustrating a camera operable to provide white balancing of images using facial color as a reference signal in accordance with one embodiment of the present invention.
Figure 2A:
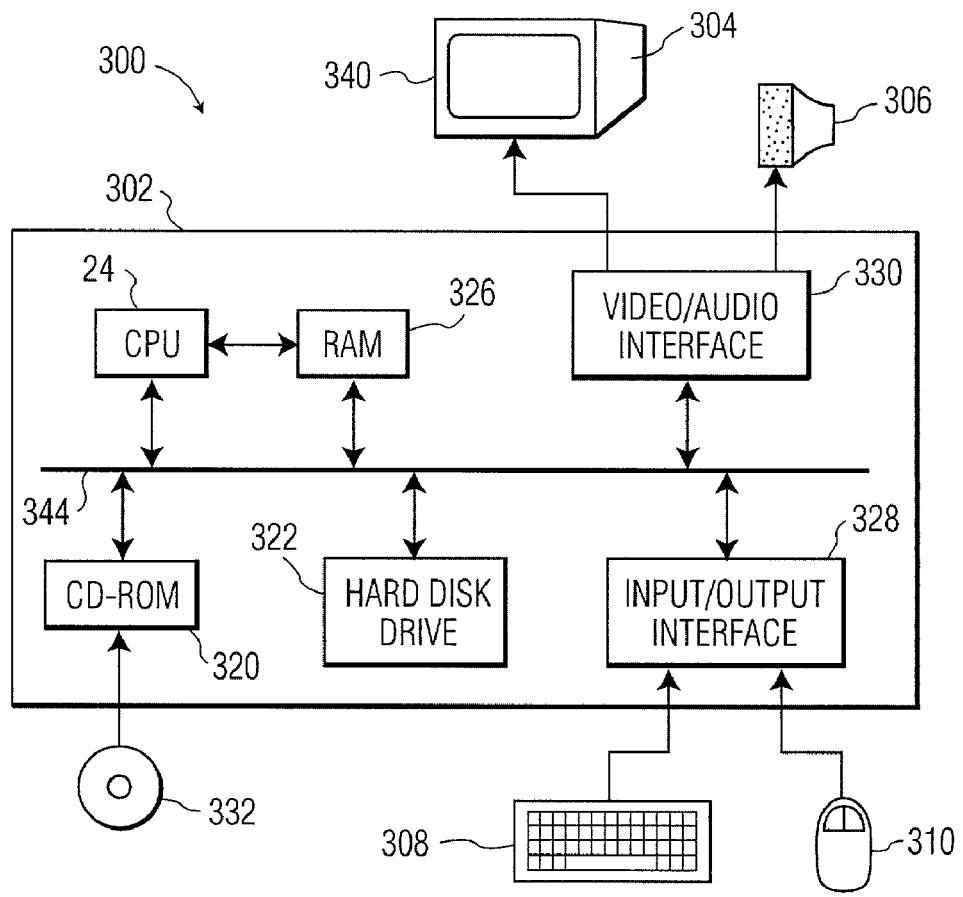
FIG. 2A is a block diagram illustrating a computer imaging system operable to provide white balancing of images using facial color as a reference signal in accordance with one embodiment of the present invention.
Figure 2B:
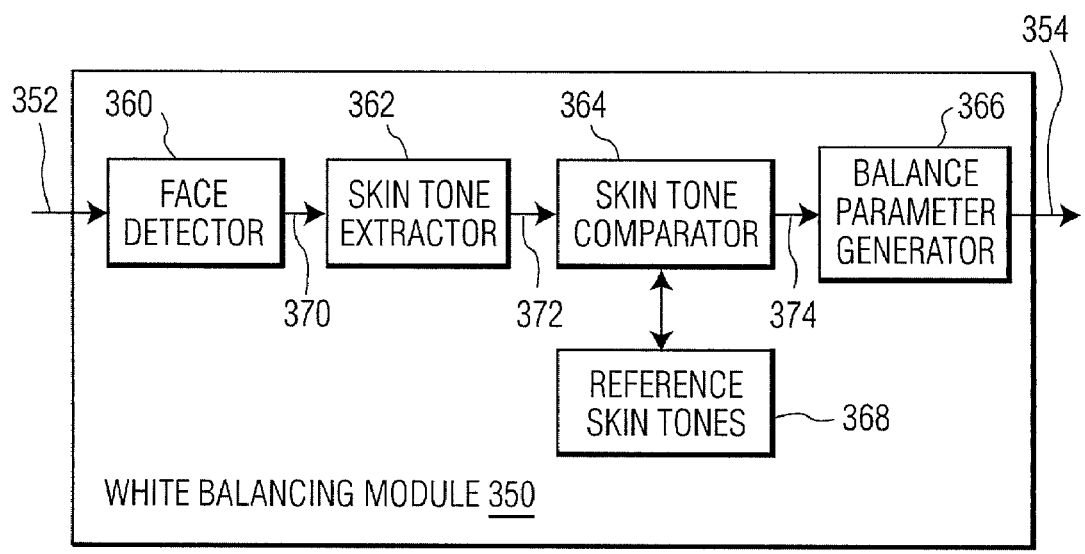
FIG. 2B is a block diagram illustrating the white balancing application used by the computer imaging system of FIG. 2A to provide white balancing of images using facial color as a reference signal in accordance with one embodiment of the present invention.
Figure 3:
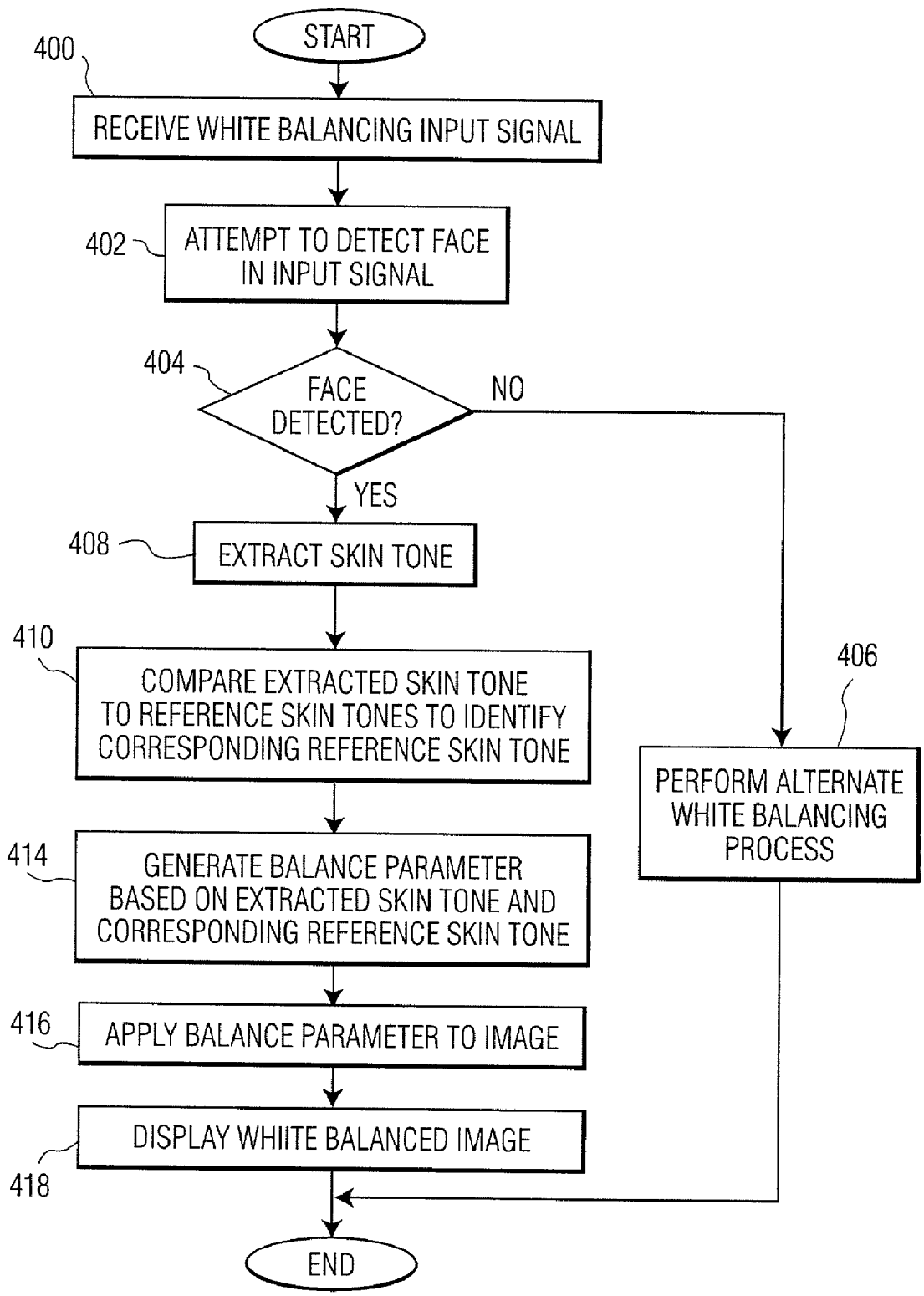
FIG. 3 is a flow diagram illustrating a method for white balancing of images using facial color as a reference signal in the camera of FIG. 1 or the computer imaging system of FIG. 2 in accordance with one embodiment of the present invention.

FIGS. 1 through 3, discussed below, and the various embodiments used to describe the principles of the present invention in this patent document are by way of illustration only and should not be construed in any way to limit the scope of the invention. In the sections that follows, the present invention will be described in three embodiments: a digital camera, a digital television set, and a computer imaging system. However, this is by way of example only and should not be construed so as to limit the scope of the invention in any way. Those skilled in the art will understand that the principles of the present invention may be implemented in any suitably arranged image processing system.

FIG. 1 is a block diagram illustrating a camera 100 operable to provide white balancing of images using facial color as a reference signal in accordance with one embodiment of the present invention. The camera 100 may comprise a digital camera, a digital camcorder, or any other suitable type of camera operable to process digital images.

The camera 100 comprises an image sensor 102, an analog-to-digital converter 104, an image processor 106, and a white balancing module 110. The image sensor 102 is operable to receive an incoming image 120 based on light reflecting off a scene at which the camera 100 is positioned to record. The image sensor 102 is also operable to generate an analog signal 122 from the incoming image 120 and to provide the analog signal 122 to the analog-to-digital converter 104.

The analog-to-digital converter 104 is operable to receive the analog signal 122 and to generate a digital signal 124 from the analog signal 122 for the image processor 106. The image processor 106 is operable to receive the digital signal 124 and to perform additional processing on the digital signal 124 to generate a displayable image 126. The displayable image 126 may be recorded within the camera 100 in a storage device 128, such as a compact flash card, a smart media card, a memory stick, or the like, and/or may be provided to an external system for recording.

The analog-to-digital converter 104 is also operable to generate a digital input frame 130 from the analog signal 122 for the white balancing module 110, and the image processor 106 is operable to receive a balance parameter 132 from the white balancing module 110 and to apply the balance parameter 132 to the displayable image 126 in order to white balance the displayable image 126.

The white balancing module 110 comprises a face detector 140, a skin tone extractor 142, a skin tone comparator 144, a balance parameter generator 146, and reference skin tones 148. According to one embodiment, the white balancing module 110 may be incorporated into an auto-gain feature for the camera 100 (not illustrated in FIG. 1) that is operable to adjust global illumination for images captured by the camera 100.

The face detector 140 is operable to receive at least one input frame 130 from the analog-to-digital converter 104 and to determine whether or not a human face is present in the input frame 130. The face detector 140 may make this determination based on a luminance-based face detection algorithm or any other suitable process operable to detect a human face within a digital image.

If the face detector 140 does detect a human face within the input frame 130, the face detector 140 is also operable to generate a detected face signal 150 for the skin tone extractor 142. The detected face signal 150 may comprise the data from the input frame 130 corresponding to the detected face, coordinates or other locators operable to identify the location of the detected face within the input frame 130, or any other suitable signal.

The skin tone extractor 142 is operable to extract a facial color model that is invariant across various ethnic groups. The skin tone extractor 142 is operable to receive the detected face signal 150 and to extract a skin tone for the detected face based on the detected face signal 150. The skin tone extractor 142 is also operable to generate an extracted skin tone signal 152 for the skin tone comparator 144. The extracted skin tone signal 152 may comprise data identifying the extracted skin tone for the detected face.

The skin tone comparator 144 is operable to receive the extracted skin tone signal 152 and to compare the extracted skin tone identified by the extracted skin tone signal 152 to a plurality of skin tones stored as reference skin tones 148. The skin tone comparator 144 is also operable to generate a comparison signal 154 for the balance parameter generator 146 based on the extracted skin tone and its corresponding reference skin tone 148.

A corresponding reference skin tone 148 comprises a reference skin tone 148 comprising the true skin tone as it would appear in the proper lighting, while the extracted skin tone comprises the skin tone as it would appear when displayed as a displayable image 126 without white balancing due to the actual lighting captured by the image sensor 102 of the camera 100. The comparison signal 154 may comprise data identifying both the extracted skin tone and the corresponding reference skin tone 148, data identifying the difference between the extracted skin tone and the corresponding reference skin tone 148, or any other suitable data operable to allow the balance parameter generator 146 to generate a balance parameter 132.

The balance parameter generator 146 is operable to receive the comparison signal 154 and to generate a balance parameter 132 based on the comparison signal 154 for the image processor 106. According to one embodiment, the balance parameter generator 146 may be operable to generate the balance parameter 132 in accordance with the principles disclosed in U.S. Pat. No. 6,069,972, by substituting the reference signal from reference white to reference skin tone. The balance parameter 132 may be applied by the image processor 106 to white balance the displayable images 126 generated by the image processor 106.

Although the face detector 140, the skin tone extractor 142, the skin tone comparator 144, the balance parameter generator 146, and the reference skin tones 148 are illustrated and described as separate components, it will be understood that any or all of these components 140, 142, 144, 146 and/or 148 may be implemented together without departing from the scope of the present invention. Furthermore, the reference skin tones 148 may be provided apart from the white balancing module 110. For example, the reference skin tones 148 may be stored in a medium that is removable from the camera 100.

In addition, any or all of the face detector 140, the skin tone extractor 142, the skin tone comparator 144, and the balance parameter generator 146 may comprise logic encoded in media. The logic comprises functional instructions for carrying out program tasks. The media comprises computer disks or other computer-readable media, application-specific integrated circuits, field-programmable gate arrays, digital signal processors, other suitable specific or general purpose processors, transmission media or other suitable media in which logic may be encoded and utilized.

FIG. 2A is a block diagram illustrating a computer imaging system 300 operable to provide white balancing of images using facial color as a reference signal in accordance with one embodiment of the present invention. According to one embodiment, the computer imaging system 300 comprises a personal computer 302, a display 304, an optional speaker 306, and at least one input device such as a keyboard 308 and/or a pointing device 310.

The personal computer 302 may comprise a compact disc (CD) read-only-memory (ROM) drive 320, a hard disk drive (HDD) 322, a central processing unit (CPU) 324, random access memory (RAM) 326, an input/output (I/O) interface (IF) circuit 328, and a video/audio interface (IF) circuit 330. The CD-ROM drive 320 is operable to receive and read removable CD-ROM discs 332.

The display 304 comprises a computer monitor for the personal computer 302. The display 304 may comprise a cathode ray tube screen, a liquid crystal display screen, a flat panel display screen, a plasma display screen, a projection display screen, or any other device suitable for displaying images. The display 304 comprises a screen 340 that is operable to display video images that may comprise human faces.

The hard disk drive 322 is operable to provide access to an operating system program, application programs, and data for storage and retrieval of information. The keyboard 308 and pointing device 310 are coupled to the personal computer 302 through the I/O IF circuit 328. The pointing device 310 may comprise a mouse or other suitable device operable to allow a user to interact with specified areas of the screen 340.

The display 304 and speaker 306 are coupled to the personal computer 302 through the video/audio IF circuit 330. The internal components of the personal computer 302, including the CD-ROM drive 320, the hard disk drive 322, the CPU 324, the RAM 326, the I/O IF circuit 328 and the video/audio IF circuit 330, are coupled to each other and communicate with each other through a communication bus 344.

As described in greater detail below, the CPU 324 is operable to invoke a white balancing module in order to adjust properly the colors of objects that appear on the screen 340. The white balancing module operates in conjunction with any other application executed in the personal computer 302 that produces a video signal, such as a streaming video application, an MPEG or AVI player, a video card that receives and demodulates an incoming RF television signal to produce a baseband video signal, and the like. In accordance with one embodiment of the present invention, the white balancing module executed by the CPU 324 may be stored on a CD-ROM 332, a 3.5 inch removable diskette (not shown in FIG. 1), in RAM 326 or any other suitable location. Thus, for one embodiment the RAM 326 may be operable to store an operating system program, a streaming video application program, an MPEG/AVI player application program, and a white balance module.

FIG. 2B is a block diagram illustrating the white balancing module 350 used by the computer imaging system 300 to provide white balancing of images using facial color as a reference signal in accordance with one embodiment of the present invention. The white balancing module 350 is operable to receive an input frame 352 from a video signal that is to be displayed by the computer 302 on the display 304 and to generate a balance parameter 354 based on the input frame 352. The white balancing module 350 comprises a face detector 360, a skin tone extractor 362, a skin tone comparator 364, a balance parameter generator 366, and reference skin tones 368.

The face detector 360 is operable to receive at least one input frame 352 from a video signal that is to be displayed by the computer 302 on the display 304 and to determine whether or not a human face is present in the input frame 352. The face detector 360 may make this determination based on a luminance-based face detection algorithm or any other suitable process operable to detect a human face within a digital image.

If the face detector 360 does detect a human face within the input frame 352, the face detector 360 is also operable to generate a detected face signal 370 for the skin tone extractor 362. The detected face signal 370 may comprise the data from the input frame 352 corresponding to the detected face, coordinates or other locators operable to identify the location of the detected face within the input frame 352, or any other suitable signal.

The skin tone extractor 362 is operable to extract a facial color model that is invariant across various ethnic groups. The skin tone extractor 362 is operable to receive the detected face signal 370 and to extract a skin tone for the detected face based on the detected face signal 370. The skin tone extractor 362 is also operable to generate an extracted skin tone signal 372 for the skin tone comparator 364. The extracted skin tone signal 372 may comprise data identifying the extracted skin tone for the detected face.

The skin tone comparator 364 is operable to receive the extracted skin tone signal 372 and to compare the extracted skin tone identified by the extracted skin tone signal 372 to a plurality of skin tones stored as reference skin tones 368. The skin tone comparator 364 is also operable to generate a comparison signal 374 for the balance parameter generator 366 based on the extracted skin tone and its corresponding reference skin tone 368.

A corresponding reference skin tone 368 comprises a reference skin tone 368 comprising the true skin tone as it would appear in the proper lighting, while the extracted skin tone comprises the skin tone as it would appear when displayed by the display 304 without white balancing. The comparison signal 374 may comprise data identifying both the extracted skin tone and the corresponding reference skin tone 368, data identifying the difference between the extracted skin tone and the corresponding reference skin tone 368, or any other suitable data operable to allow the balance parameter generator 366 to generate a balance parameter 354.

The balance parameter generator 366 is operable to receive the comparison signal 374 and to generate a balance parameter 354 based on the comparison signal 374. According to one embodiment, the balance parameter generator 366 may be operable to generate the balance parameter 354 in accordance with the principles disclosed in U.S. Pat. No. 6,069,972, by substituting the reference signal from reference white to reference skin tone. The balance parameter 354 may be applied to white balance the images displayed on the display 304.

Although the face detector 360, the skin tone extractor 362, the skin tone comparator 364, the balance parameter generator 366, and the reference skin tones 368 are illustrated and described as separate components, it will be understood that any or all of these components 360, 362, 364, 366 and/or 368 may be implemented together without departing from the scope of the present invention.

Furthermore, the reference skin tones 368 may be provided apart from the white balancing module 350. For example, the reference skin tones 368 may be stored in a medium that is removable from the computer 302, in the RAM 326 or other suitable location, while the remainder of the white balancing module 350 is provided elsewhere.

In addition, any or all of the face detector 360, the skin tone extractor 362, the skin tone comparator 364, and the balance parameter generator 366 may comprise logic encoded in media. The logic comprises functional instructions for carrying out program tasks. The media comprises computer disks or other computer-readable media, application-specific integrated circuits, field-programmable gate arrays, digital signal processors, other suitable specific or general purpose processors, transmission media or other suitable media in which logic may be encoded and utilized.

FIG. 3 is a flow diagram illustrating a method for white balancing of images using facial color as a reference signal in the camera 100, the computer imaging system 300 or any other suitable imaging system in accordance with one embodiment of the present invention. The method begins at step 400 where a white balancing input signal 130, 352 is received from a digital image. At step 402, an attempt is made to detect a human face in the input signal 130, 352.

At decisional step 404, a determination is made regarding whether or not a face was detected in the input signal 130, 352. If no face was detected in the input signal 130, 352, the method follows the No branch from decisional step 404 to step 406. At step 406, any suitable alternate white balancing process may optionally be performed, after which the method comes to an end.

Returning to decisional step 404, if a face was detected in the input signal 130, 352, the method follows the Yes branch from decisional step 404 to step 408. At step 408, a skin tone for the detected face is extracted. At step 410, the extracted skin tone is compared to reference skin tones 148, 368 to identify a corresponding reference skin tone 148, 368.

At step 414, a balance parameter 132, 354 is generated based on the extracted skin tone and the corresponding reference skin tone 148, 368. At step 416, the balance parameter 132, 354 is applied to the digital image in order to white balance the digital image. At step 418, the white balanced digital image may be displayed, after which the method comes to an end.

Thus, when the balance parameter 132, 354 generated based on the extracted skin tone and the corresponding reference skin tone 148, 368 is applied to the entire digital image, the colors displayed for the digital image may all be corrected. In this way, the entire digital image may be white balanced based on the skin tone of a human face within the digital image that is corrected using a corresponding reference skin tone 148, 368.

Although the present invention has been described with several embodiments, various changes and modifications may be suggested to one skilled in the art. It is intended that the present invention encompass such changes and modifications as fall within the scope of the appended claims.

What is claimed is:

1. A method for white balancing images using facial color as a reference signal, comprising:
   receiving a white balancing input signal from a digital image;
   determining whether a human face is detected in the input signal;
   extracting a skin tone for the detected face when the face is detected in the input signal;
   comparing the extracted skin tone to a plurality of reference skin tones to identify a corresponding reference skin tone;
   generating a balance parameter based on the extracted skin tone and the corresponding reference skin tone; and
   performing an alternate white balancing process when no face is detected in the input signal.

2. The method of claim 1, further comprising applying the balance parameter to the digital image in order to white balance the digital image.

3. The method of claim 1, further comprising displaying the white balanced digital image.

4. The method of claim 1, further comprising generating a detected face signal when a face is detected within the digital image.

5. The method of claim 1, determining whether a human face is detected in the input signal comprising performing a luminance-based face detection algorithm on the input signal.

6. A system for white balancing images using facial color as a reference signal, comprising:
   a computer-processable medium; and
   logic stored on the computer-processable medium, the logic operable to receive a white balancing input signal from a digital image, to determine whether a human face is detected in the input signal, to extract a skin tone for the detected face when the face is detected in the input signal, to compare the extracted skin tone to a plurality of reference skin tones to identify a corresponding reference skin tone, to generate a balance parameter based on the extracted skin tone and the corresponding reference skin tone, and to perform an alternate white balancing process when no face is detected in the input signal.

7. The system of claim 6, the logic further operable to apply the balance parameter to the digital image in order to white balance the digital image.

8. The system of claim 6, the logic further operable to display the white balanced digital image.

9. The system of claim 6, the logic further operable to generate a detected face signal when a face is detected within the input signal.

10. The system of claim 6, the logic operable to determine whether a human face is detected in the input signal by performing a luminance-based face detection algorithm on the input signal.

11. An imaging system, comprising:
   a digital image source;
   a white balancing module coupled to the digital image source, the white balancing module operable to produce at an output a balance parameter for a digital image received from the digital image source, the white balancing module comprising
   a face detector operable to receive the digital image and to detect a human face within the digital image,
   a skin tone extractor coupled to the face detector, the skin tone extractor operable to extract a skin tone from the digital image, the extracted skin tone associated with a human face detected by the face detector,
   a plurality of reference skin tones,
   a skin tone comparator coupled to the skin tone extractor, the skin tone comparator operable to access the reference skin tones and to compare the extracted skin tone to the reference skin tones in order to identify a reference skin tone corresponding to the extracted skin tone, and
   a balance parameter generator coupled to the skin tone comparator, the balance parameter generator operable to generate a balance parameter at the output of the white balancing module, the balance parameter based on the extracted skin tone and the corresponding reference skin tone; and an image processor coupled to the digital image source and the output of the white balancing module, the image processor operable to white balance the digital image and generate a displayable image, wherein the image processor white balances the digital image based on the balance parameter when a human face is detected in the digital image and performs an alternate white balancing process when no face is detected in the digital image.

12. The system of claim 11, the face detector operable to detect a human face within the digital image based on a luminance-based face detection algorithm.

13. The system of claim 11, the face detector operable to generate a detected face signal for the skin tone extractor when a face is detected within the digital image.

14. The system of claim 13, the detected face signal comprising data from the digital image corresponding to the detected face.

15. The system of claim 13, the detected face signal comprising locators operable to identify a location of the detected face within the digital image.

16. The system of claim 11, the skin tone extractor operable to generate an extracted skin tone signal for the skin tone comparator based on the extracted skin tone, the extracted skin tone signal comprising data identifying the extracted skin tone.

17. The system of claim 11, the skin tone comparator operable to generate a comparison signal for the balance parameter generator, the comparison signal comprising data identifying the extracted skin tone and the corresponding reference skin tone.

18. The system of claim 11, the skin tone comparator operable to generate a comparison signal for the balance parameter generator, the comparison signal comprising data identifying the difference between the extracted skin tone and the corresponding reference skin tone.

* * * * *